United States Patent
Chadwick et al.

(10) Patent No.: US 6,992,466 B2
(45) Date of Patent: Jan. 31, 2006

(54) WAVEFORM CONTROL SYSTEM

(75) Inventors: David Chadwick, New Milton (GB); Martyn R. Harris, Winchester (GB); John A. Lyons, Southampton (GB); Jeremy Mortimer, Winchester (GB)

(73) Assignee: Bowman Power Group Ltd., Southampton (GB)

( * ) Notice: Subject to any disclaimer, the term of this patent is extended or adjusted under 35 U.S.C. 154(b) by 214 days.

(21) Appl. No.: 10/433,696

(22) PCT Filed: Dec. 29, 2000

(86) PCT No.: PCT/GB00/05011

§ 371 (c)(1),
(2), (4) Date: Oct. 30, 2003

(87) PCT Pub. No.: WO02/052710

PCT Pub. Date: Jul. 4, 2002

(65) Prior Publication Data

US 2004/0075424 A1    Apr. 22, 2004

(30) Foreign Application Priority Data

Dec. 22, 2000   (WO) ..................... PCT/GB00/04977

(51) Int. Cl.
*H02P 9/04*   (2006.01)

(52) U.S. Cl. .................. 322/37; 322/20; 290/40 C; 361/13; 361/1
(58) Field of Classification Search .......... 322/17, 322/20, 25, 37; 363/13, 37, 66, 125; 290/40 C See application file for complete search history.

(56) References Cited

U.S. PATENT DOCUMENTS

| 4,823,251 A | 4/1989 | Kawabata et al. ............. 363/95 |
| 4,969,080 A | 11/1990 | Kawabata et al. ............. 363/41 |
| 5,307,259 A | 4/1994 | Hügel et al. ................. 364/176 |
| 5,349,351 A * | 9/1994 | Obara et al. ................. 341/141 |
| 5,351,178 A * | 9/1994 | Brennen et al. ............... 363/40 |
| 5,469,044 A * | 11/1995 | Gyugyi et al. ............... 323/207 |
| 6,144,190 A * | 11/2000 | Scott et al. .................. 322/25 |
| 6,316,918 B1 * | 11/2001 | Underwood et al. .......... 322/20 |
| 6,700,214 B2 * | 3/2004 | Ulinski et al. ............ 290/40 C |
| 6,700,802 B2 * | 3/2004 | Ulinski et al. ................ 363/37 |

FOREIGN PATENT DOCUMENTS

JP   2000060150   2/2000

\* cited by examiner

*Primary Examiner*—Nicholas Ponomarenko
(74) *Attorney, Agent, or Firm*—Price, Heneveld, Cooper, DeWitt & Litton, LLP

(57) ABSTRACT

An apparatus for the improvement of AC waveform comprising means for applying a demand input waveform at an input of a circuit for power conditioning (including an inverter PWMVC or BBHCC) that is operable to provide an output waveform at an output; a feedback loop between the input and output, the feedback loop including means for sampling the output waveform (ADC1), means for subtracting a required waveform (RW) from the output waveform to produce an error waveform, means for processing the error waveform in a pre-defined manner to produce a processed error waveform (Clip1, Disc1, Att1), means for adding or subtracting the processed error waveform from Th. demand waveform to produce a revised demand waveform, and means for applying the revised demand waveform to the input of the power conditioning circuit at a subsequent time as an input demand waveform to produce a new AC output waveform at the output.

58 Claims, 5 Drawing Sheets

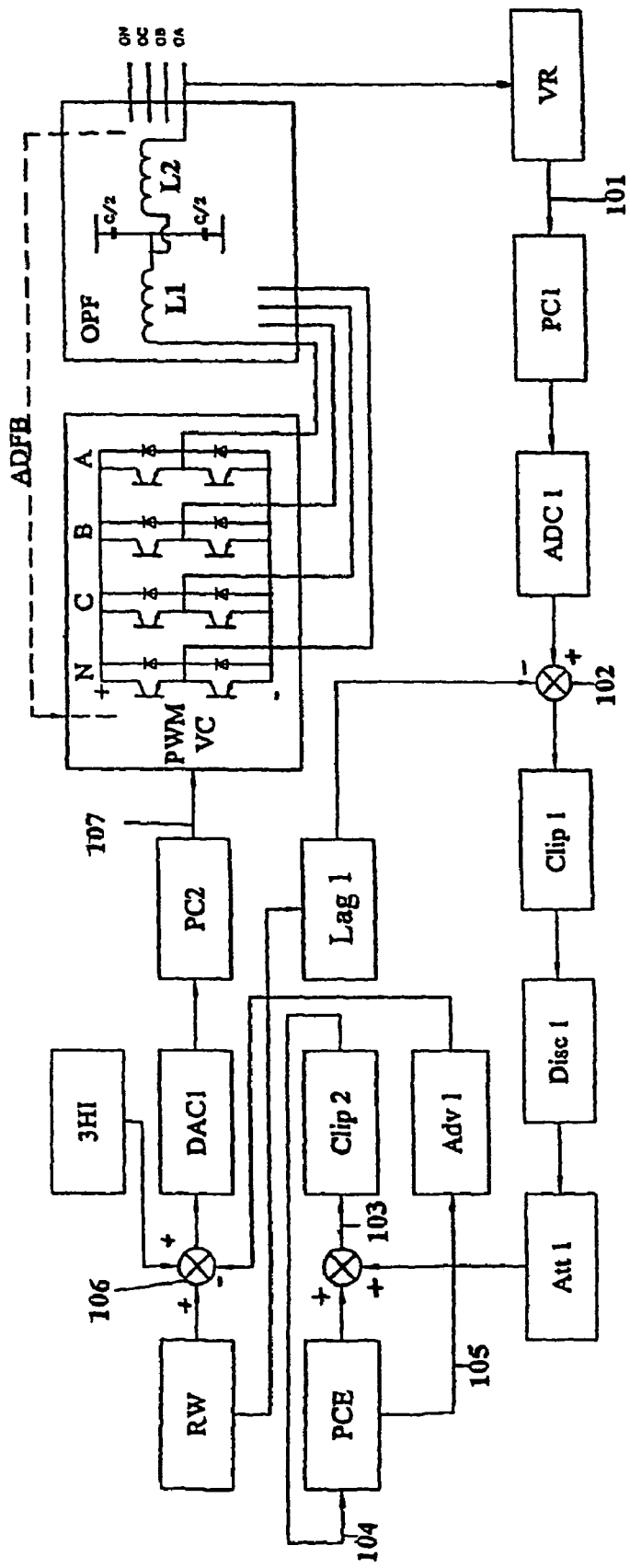
*Figure 2 – Voltage drive*

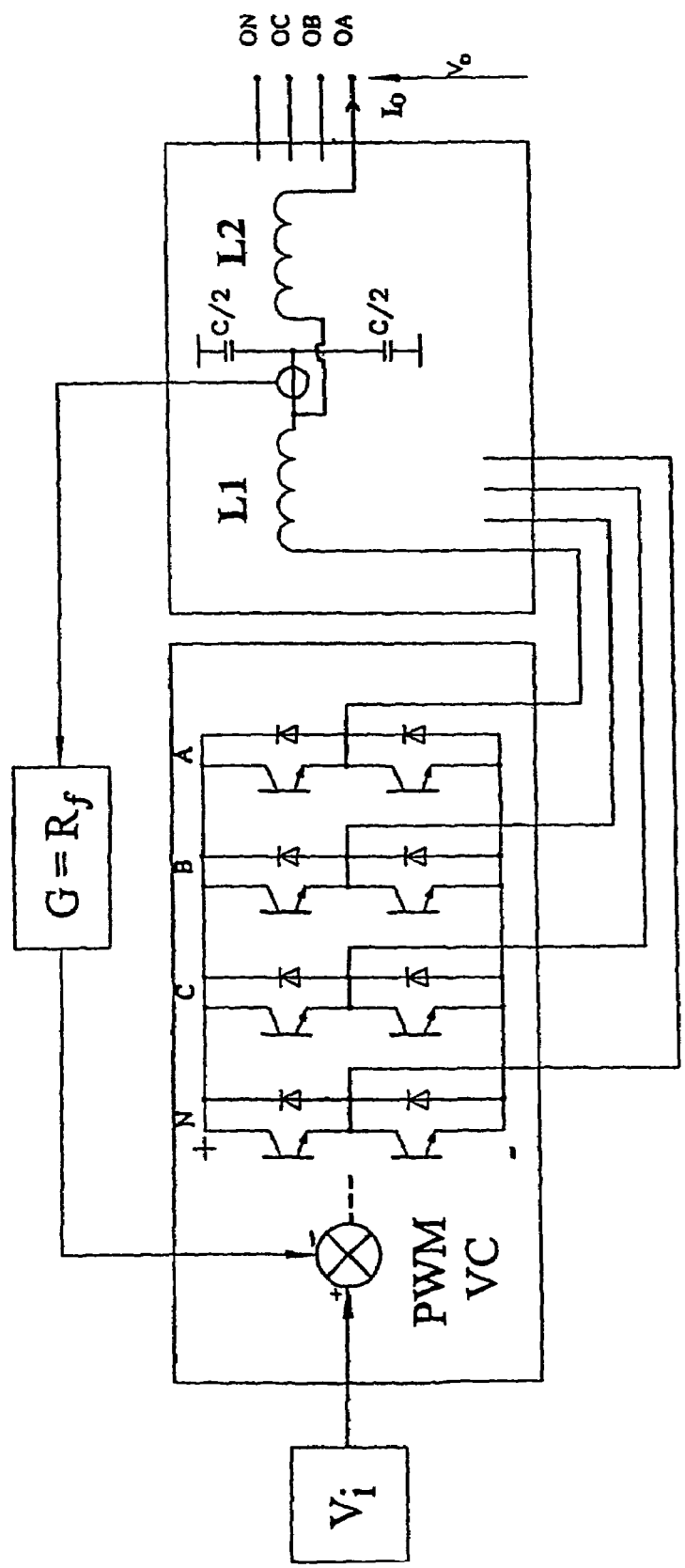
Figure 3 - Active Damping for Voltage Drive

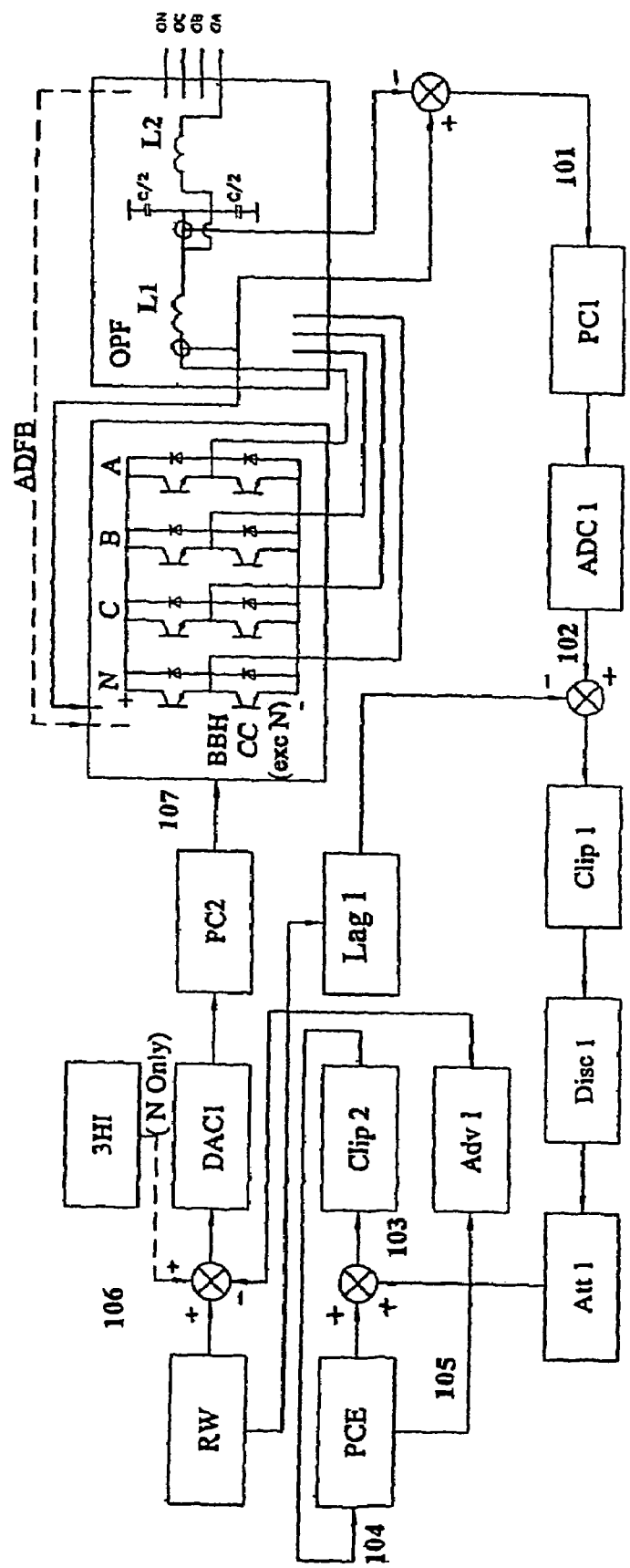
Figure 4 - Current Drive

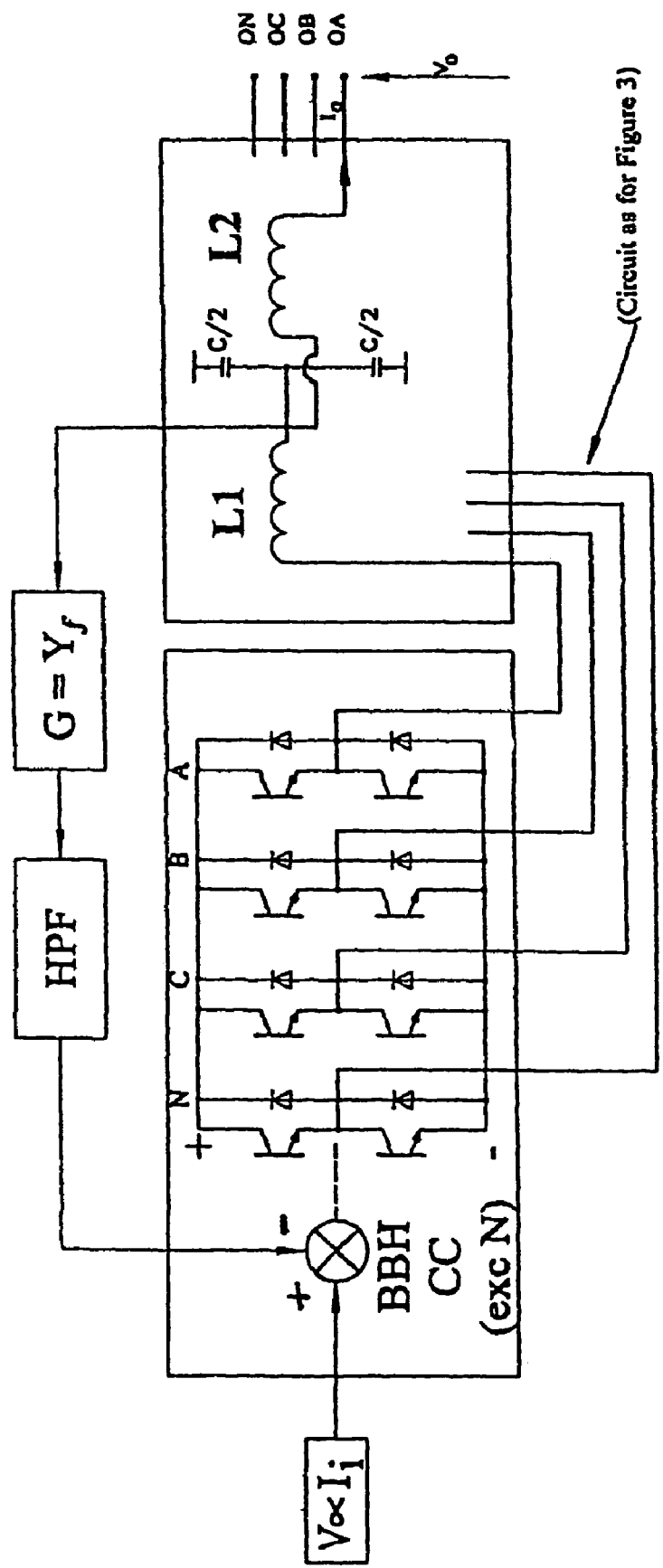
Figure 5 - *Active Damping for Current Drive*

WAVEFORM CONTROL SYSTEM

CROSS-REFERENCE TO RELATED APPLICATIONS

This application is the National Stage of International Application No. PCT/GB00/05011, filed on Dec. 29, 2000, which is a continuation-in-part of and claims priority on International Application No. PCT/GB00/04977, filed on Dec. 22, 2000.

The present invention relates generally to electronic power conditioning units that contain inverters or converters and are used to supply AC power either as voltage-drives into a load or as current-drives for example into a power distribution network. In particular, the present invention relates to generators that contain such power conditioning units and are required to provide a voltage or current output waveform of high quality.

Electronic power conditioning units provide output power that reproduces as closely as possible an AC signal waveform that represents the required magnitude and shape of the output waveform. Power conditioning units may include a DC-to-AC inverter and derive power from a DC supply or may include a direct AC-to-AC converter and be powered by an AC source. Alternatively, power conditioning units may include a rectifier that produces a DC supply followed by a DC-to-AC inverter as before.

Power conditioning units produce output voltage and current waveforms with different characteristics according to application. It is well known that if output power is to be supplied into a load then the output voltage of the power conditioning unit normally needs to be 'stiff'. This means that the voltage waveform has to have a magnitude that is either constant or controlled so as to vary slightly in a predetermined way with load. In addition, the shape of the waveform has to remain close to a demanded shape (usually sinusoidal) under all load conditions. In this case the current drawn is determined by the load, both in magnitude and shape of waveform, and so the current characteristic is 'soft'. Such a power conditioning unit may be described as a voltage-drive.

If the power is to be supplied into a power distribution network, then it is usually, though not necessarily, the output current of the power conditioning unit that needs to be stiff. In this case, it is the output voltage that adapts readily to the magnitude and shape of the voltage waveform that is applied by the distribution network to the output terminals of the unit. Hence, in this case, the voltage characteristic needs to be soft. Such a power conditioning unit may be described as a current-drive.

Power conditioning units that include inverters and converters that operate at substantial power ratings generally have to maintain good efficiency and at the same time offer good waveform quality. This means that they typically operate in a switched mode in order to minimize internal losses and thus achieve acceptable efficiency. These inverters have many switching operations per AC cycle so that detailed control of the output waveform is possible. An output filter is normally included to remove the majority of the high frequency ripple in the output voltage and/or current waveform that is associated with the switching action. A well known example of a switched-mode technique for shaping the output waveform is pulse-width modulation (PWM). Typically PWM inverters at present employ IGBTs as the switched output devices and commonly have PWM frequencies up to about 15 kHz, this frequency being either fixed or variable throughout the AC cycle according to preference.

Power conditioning units are used in electrical generators to accept electrical power in whatever form it is made available from a preceding stage and to provide output electrical power in a form suited to the application. FIG. 1 shows an example of an electrical generator that comprises a prime mover in the form of a gas turbine, mechanically coupled to a permanent-magnet poly-phase alternator. Electrically connected to the alternator is a power conditioning unit for converting the output voltages at the terminals of the alternator to the voltage waveforms required at the output of the generator. The power conditioning unit comprises a rectifier that takes the alternator voltages as input and produces a DC link voltage as output. Connected to the output of the rectifier is a PWM inverter that takes the DC link voltage as input and produces at its output three-phase voltages. These typically contain a large content of high-frequency ripple associated with the PWM action. Connected to the output of the PWM inverter is a three-phase series-inductance/parallel-capacitance (L-C) output filter that removes the majority of the high-frequency ripple.

The electrical generator of FIG. 1 is commonly referred to as a 'micro-turbine-generator, MTG, which is able to provide a relatively small amount of power typically from a few kW to a few MW. An advantage of micro-turbine-generators is that instead of having a few generators of very large power rating at fixed locations and transmitting power over large distances for distribution to consumers, the power is generated in a multiplicity of generators of smaller power rating which are spread locally among consumers. These generators may operate to provide power to local loads or to a multiplicity of points in a distribution network or to a parallel combination of local loads and a distribution network. It should be noted that the output characteristic of the generator inverter in this last case is typically current-drive when there is connection to the distribution network, changing rapidly to voltage-drive if this connection is lost.

Micro-turbine-generators are usually required to maintain very good waveform quality. When operating as voltage-drives, they must maintain a voltage waveform that is sufficiently good that correct arid trouble free operation of any connected equipment such as computers and other electronic business equipment is not endangered. As current-drives they must maintain a low harmonic content or alternatively a specified harmonic content so as to spread harmonic load around the network in the most advantageous manner. This is needed so that local voltage is not distorted by unwanted levels of harmonic current flowing through the impedances associated with the various parts of the distribution network. As an example of very good waveform quality, it is advantageous if an MTG operating as a voltage-drive is capable of maintaining 2% to 3% total RMS harmonic distortion (or THD), measured up to a frequency that includes the switching frequencies associated with switched-mode operation and working into a highly non-linear load that has a full load current demand with a crest factor (defined as the ratio of peak current to RMS current) of 3.0.

In electronic power conditioning units, there is an identifiable input point within the unit to which a signal waveform, i.e. the required waveform, is applied to cause an output waveform to be produced on an output line. Because of various distortion effects within the power conditioning unit the actual output waveform typically deviates from the required waveform, introducing unwanted harmonics into its shape, the extent and nature of the deviation being dependent on the load drawn from the output. A well known method for improving waveform quality in this situation is by some form of feedback, in which a signal proportional to the voltage at the output is fed back and combined with the signal representing the required waveform. The output waveform is thus adapted to approximate more nearly to the required waveform. There is a large body of literature on feedback control techniques of this type. In particular, classical linear control is well documented. In this method, the signal fed back is proportional in magnitude to the output signal and feedback from output to input occurs throughout each AC cycle of operation, either continuously in the case of analog control or sample-by-sample in the case of digital control.

Classical linear control, however, does not readily enable sufficiently good output waveform quality to be achieved with the power conditioning unit typically used in micro-turbine-generators. This is because the frequency response characteristics of the total signal path around the closed loop are such that it is difficult to achieve sufficiently high magnitudes of loop gain at the frequencies for which reduction of distortion is needed, without causing either instability or at least a slowly decaying transient response to sudden disturbances to occur in the whole feedback system. Instability renders the power conditioning unit of no practical use and a slowly decaying response allows the output waveform to degrade on average to an unacceptable extent.

Design of a control system having acceptable performance is further complicated by the need for robustness, which may be defined as the maintenance over a wide range of load conditions at the output terminals of a combination of a low level of distortion of the output waveform, good stability and acceptably rapid decay of transient response to sudden disturbances. The permissible range of load conditions is usually specified by the manufacturer of the generator and covers: range of variation of RMS current and RMS voltage; magnitude of load impedance, given by the ratio of RMS voltage to RMS current; phase angle of the load, given by the angle of the fundamental component of the output current waveform relative to the fundamental component of the output voltage waveform, which typically may vary from nearly 90 degrees lagging (strongly inductive load) to zero or perhaps a few degrees leading (slightly capacitive load); non-linearity of the load, generally expressed by the crest-factor and typically ranging from 1.4 (linear load) to 3.0.

In view of the foregoing comments, it can be seen that there is a need for a system and method for improving waveform quality at the output of a generator.

An object of the invention is to provide a form of feedback for reducing unwanted distortion in an output AC waveform, so as to cause it to follow closely a required waveform.

Various aspects of the present invention are defined in the independent claims. Some preferred features are specified in the dependent claims.

In particular, according to one aspect of the present invention, there is provided an apparatus for power conditioning comprising means for applying an input demand waveform to produce an output waveform; means for sampling the output waveform; means for subtracting the required waveform from the output waveform to produce an error waveform; means for processing the error waveform in a pre-defined manner to produce a processed error waveform; means for subtracting the processed error waveform from the demand waveform to produce a revised demand waveform, and means for applying the revised demand waveform at a subsequent time as an input demand waveform to produce a new AC output waveform.

According to another, more specific aspect of the invention, there is provided an apparatus for power conditioning comprising means for applying an input demand waveform to produce an output waveform; means for sampling the output waveform; means for subtracting the required waveform from the output waveform to produce an error waveform; means for processing the error waveform in a predefined manner to produce a processed error waveform; means for summing previous processed error waveforms and processing the sum to produce a processed cumulative sum of processed error waveforms; means for adding the processed error waveform to the processed cumulative sum of processed error waveforms to produce a new cumulative sum of processed error waveforms; means for further processing the cumulative sum of processed error waveforms immediately before or immediately after the addition of the processed error waveform; means for subtracting the new cumulative sum of processed error waveforms from the required waveform to produce a revised demand waveform, and means for applying the revised demand waveform at a subsequent time as an input demand waveform to produce a new AC output waveform.

The object of the invention is fulfilled by progressively building up a demand waveform over a number of cycles, which demand waveform differs from the required waveform in such a way that the output waveform is caused to better approximate to the required waveform. In preferred embodiments, the output waveform is sampled and digitally stored over one complete AC cycle, termed cycle n, and the required waveform is subtracted from the sampled output waveform to provide an error waveform. The magnitude of the error waveform is then digitally processed so as to cause the output waveform to settle quickly and to approximate closely to the required waveform. This processed error waveform is subtracted from the demand waveform used in cycle n to generate a modified demand waveform, which is applied to control the output AC waveform preferably in the cycle (n+1) immediately after cycle n. At any time, the demand waveform is equal to the required waveform minus the cumulative sum of processed error waveforms fed back in previous successive cycles. This whole cycle-by-cycle procedure, which may be termed cyclic feedback, is repeated continuously whenever the inverter is operational and good waveform quality is required.

The precise way in which the demand waveform is built up is affected by the characteristics of the electronic hardware of the power conditioning unit if optimum performance is to be achieved for the complete control system. Of particular importance in this regard are the phase-frequency characteristics of the complete feedback loop comprising the forward path from input to output plus the feedback path from output to input. These phase-frequency characteristics are designed, in such a way as to enhance the performance of the control system. The signal processing algorithms are selected and designed so as to combine with the phase-frequency characteristics to best effect.

In accordance with the invention, means are provided to carry out a number of processes on electrical signal waveforms. These processes may be split into three stages: processing of the error waveform derived from the last cycle; processing of the cumulative error waveform derived from cycles previous to the last and processing of the new cumulative waveform formed by adding the processed error waveform derived from the last cycle to the processed cumulative error waveform derived from cycles previous to the last. The processes are listed in a preferred and convenient order, but it will be clear that this order may be considerably changed, even to the extent in some cases of changing the stage at which a process is performed, without losing the beneficial effects of each process.

The output waveform is sampled and stored over usually one complete AC cycle, termed cycle n, and the required waveform then subtracted from the output waveform to provide the error waveform for that cycle. This error waveform is then processed in a variety of ways, typically by digital means. However, additional to this processing, the phase-frequency characteristics of the cyclic feedback loop may be modified by the inclusion of phase-compensators, PC1 and PC2, discussed later. These are typically analogue and as part of their function they may have the effect of modifying error waveforms.

The aim of the processing is three-fold (1) to ensure that after a sufficient number of cycles the output waveform has converged towards the required waveform so that the two waveforms are equal to a good approximation; (2) to enable this good approximation to be achieved in a small number of cycles by enabling the output waveform to settle to the required waveform acceptably quickly following any sudden disturbance of operating conditions (NB because of the difference in application, voltage-drives generally call for a shorter settling time than current-drives) and (3) to make the achievement of the two previous aims robust to variations in the load conditions at the output terminals.

The processing of the error waveform may advantageously take the form of any one of or all of the following steps: (a) correction relative to the time-base of the AC signal for any time-displacement effects that are known to be inherent in the signal sampling; (b) clipping the modulus values of any parts of the waveform that exceed a selected maximum limit to that limit; (c) attenuating the waveform magnitude in various ways, for example, by multiplying the waveform by a gain co-efficient less than unity or by subtracting a constant amount from the modulus of the signal at each point of the waveform and wherever the result of the subtraction is less than zero setting the value of the signal at that point to zero, or by a zoned procedure, in which different zones of the AC cycles are attenuated in accordance with differently defined algorithms, the zones being different regions of time in the AC cycle or different ranges of signal magnitude; (d) discretising the signal, i.e. modifing the signal so that the magnitude assumes discrete values, with the discretisation level (magnitude of the change between each discrete value) being selected for optimum effect and different from that occurring automatically in the signal sampling, and (e) discarding, i.e. setting to zero, parts of the error waveform where the modulus value is less than a selected threshold value.

Once the error waveform of a given cycle is processed, it may advantageously be added to a cumulative sum of processed error waveforms fed back in previous cycles and may be stored as a new cumulative waveform. This cumulative sum may be subjected to further processing between successive cycles, the aims of the further processing being the same as described above. After any such processing, the processed error waveform from cycle n is added to the processed cumulative error waveform from previous cycles, to yield a new cumulative error waveform. This new cumulative error waveform may then be subjected to further signal processing, before being finally subtracted from the required waveform to yield a revised demand waveform.

This demand waveform is used to control the output AC waveform in a cycle subsequent to n, preferably in the cycle (n+1) immediately following cycle n.

In respect of the cumulative sum of processed error waveforms from cycles previous to the last cycle, this cumulative waveform may be further signal processed, in principle by any one or selected combination of the process steps set out in (b) to (e). However, it may be particularly advantageous to attenuate the magnitude of the waveform using any one of the procedures described in (c), the degree of attenuation being independent of that in (c).

When the processed error waveform from the last cycle has been added to the processed cumulative sum of error waveforms from all cycles previous to the last, to produce a new processed cumulative error waveform, this waveform may again be subjected to further signal processing. This may take the form of any of the processes set out in (b) to (e), but in particular advancing the whole waveform in time relative to the output waveform. It should be noted that it is theoretically conceivable, depending on the phase-compensators built into the feedback loop, that the time adjustment could be time-retard rather than time advance, but in practice, this is unlikely. Processing at this stage may further involve clipping the waveform as set out in (b), but with an independently chosen value of clipping limit.

The processes of clipping, discretising and discarding are essentially non-linear. Attenuating the signal may be linear or non-linear. As is well known, a combination of non-linear processes results in complex interactions between the effects of one process and another. In consequence it is impossible to state precisely the effect produced by each individual contributory process and how the processes may be best combined in a particular power conditioning unit in order to achieve the best overall result. A degree of heuristic trial-and-error may be accepted, both in designing a feedback system for a particular class of application and in setting up the system for each individual application.

Nevertheless, in general terms the effect of correcting the signal relative to the time-base of the AC signal is to remove a simple error introduced by the imperfections of instrumentation. The main effects of clipping are to prevent the error signal being so large that the output of the inverter is driven hard against its output limits and to prevent a large response to a transient distorting signal that may occasionally be experienced during only one cycle. The effects of attenuating and discretising the signal are particularly important and serve mainly to improve, in different ways, the stability and robustness of the system. The effect of the step of discarding is similar to the step of discretising and additionally causes the feedback system not to make further changes in subsequent cycles to errors that are already small. This can have a beneficial effect in reducing a tendency for error signals at high frequency to grow in magnitude although they do not significantly affect the output waveform because of the strong attenuating effect of the output filter at high frequencies. The effect of attentuating the cumulative error signal is to cause the accumulated error signal to decay with time and therefore to require a degree of continuous refreshing by the action of cyclic feedback, this refreshing being beneficial in some circumstances to stability and robustness. The effect of advancing the waveform adjusts the error waveform in time relative to the output waveform.

One or more phase-compensators may be provided in the feedback loop. These provide a capability to make the characteristic of phase-shift of a signal transmitted around the complete cyclic feedback loop (but excluding the effect of time advance) more nearly linear as a function of the frequency of the signal, over a pre-determined frequency range. This has advantage for the operation of the system, as discussed below.

A further feature of the invention is that the power conditioning unit is designed so that the total sum of phase-lags around the complete feedback loop, including the effect of any phase-compensators, is made to increase as nearly as possible proportionately to the frequency, over as large a part as possible of the frequency spectrum, extending up to close to the basic switching frequency of the switched-mode operation. Such a phase-lag characteristic approximates to a time-lag that is constant for all frequencies. This time-lag may then be simply compensated by adjusting the time-advance of the error waveform relative to the output waveform, so reducing the residual phase error after compensation to a low level over a wide range of frequency. This residual phase error should be less than plus/minus 90° at important frequencies, preferably less than plus/minus 60°, preferably significantly less than plus/minus 60°, and ideally as small as possible, in order to achieve stable and reasonably robust operation with low waveform distortion.

In seeking to achieve the near-linear phase-frequency characteristic described above, an additional design feature can assist in reducing the residual phase error introduced due to the effects of the L-C filter that is typically provided at the output of power conditioning units. This feature comprises means to make the variation of phase with frequency of an L-C filter (assuming that to be the form of the output filter in the electronic power conditioning unit as already described) less abrupt as frequency is varied from below to above the resonant filter frequency. An L-C filter causes a phase difference of the output signal of the filter relative to the input signal, varying from zero electrical degrees at a frequency sufficiently below the resonant filter frequency up to 180° lag at a frequency sufficiently above the resonant frequency. If the filter is only lightly damped, as would naturally be the case in this application, most of this 180° phase change occurs in a very narrow frequency band. This is undesirable because it inevitably causes an excursion in the residual phase error, even after compensation by careful adjustment of the time-advance, which extends from nearly −90° to +90°, centered on the resonant frequency. This implies that the feedback system is operating close to instability.

The situation can be considerably improved by adding an inner electronic feedback loop around the L-C filter that acts to damp the filter resonance. This has the benefit of reducing transient bursts of oscillation in the output waveform that tend to occur at the resonant frequency of the filter. This can be done without the penalty of power loss that would occur if the damping was alternatively achieved by the inclusion of passive resistance in appropriate parts of the circuit. As is well known, substantial damping has the effect of causing the 180° variation of phase angle to take place more slowly over a wider frequency band. Consequently this variation of phase angle with frequency is made to approximate more closely to linear proportionality. If necessary, this slower variation of phase angle can be further tailored towards linearity by the addition of suitably designed phase-compensator circuits in the feedback loop. Overall therefore the addition of the active damper circuit acts to enable the total phase-frequency characteristic of the loop to approximate much more nearly to linear proportionality, and as previously explained, this in turn enables the residual phase error after further compensation by the time-advance technique to be substantially reduced.

Instead of damping the filter, it is in principle possible to compensate the phase-frequency characteristic of an undamped resonant circuit by the addition of a suitable designed phase-compensator. However, this needs to be accurately tuned and in practice the required tuning may vary with load due to saturation effects in the inductor.

For distortion harmonics whose frequencies are close to the switching frequency of the switched-mode operation of the power conditioning unit, it is generally the case that the total phase-lag characteristics of the loop are not susceptible to the required close control, leading to a tendency to instability at the higher frequencies. But that frequency band can be made unimportant to the invention because the loop gain within that band is characteristically low, due particularly to the attenuating action of the output filter. Therefore, a moderate degree of discretisation of the error signal transmitted around the loop, as described in (d) above and also to some extent in (e), can cause signals in this frequency band to be largely lost in the discretisation. The preferred level of discretisation of the error signal may be with discrete steps set at around 2–3% of the peak AC output voltage. However, the level of discretisation may vary considerably depending upon the overall design of the power conditioning unit. Feedback at troublesome frequencies is thus effectively suppressed and stability preserved, while at the same time the overall loss of accuracy in the waveform due to the coarsening effect of the discretisation is acceptably low. It may be noted that, in a digitally implemented PWM scheme, a time-quantising effect is introduced by the processor clock-cycles, and this effectively discretises the magnitudes of signals passing through the inverter in a manner that may significantly contribute to the discretisation requirement described above.

In order to compensate for phase error effects, in preferred embodiments processing may advantageously take the form of advance of the error waveform and/or the cumulative error waveform in time relative to the output waveform.

In the present invention, feedback is not continuous or sample-by-sample and is quite different in nature to classical linear control. Use is made of simple non-linear techniques (signal discretisation, clipping, discarding) to improve the stability of the feedback system. The method of the invention is not immune to instability problems, but it has been shown by simulation studies and in manufactured power conditioning units that a substantially lower level of output waveform distortion can be achieved in this application by the invention than is readily achievable by linear control. Moreover, the manner of feedback is essentially simple both in concept and in its practical realization.

The objective, particularly with voltage-drives, is usually to set the gain as high as possible without stability being impaired. This is because with cyclic feedback the output waveform is briefly distorted at start-up and during any sudden change in the load condition and settles transiently to its correct shape in a short time, this settling time being reduced by increasing the gain. In practice, the gain can usually be set so that a substantial fraction of the transient error in the output waveform has disappeared after one cycle and the waveform has substantially settled within only a few cycles.

If the power conditioning unit is of the usual switched-mode type, then the presence of a high frequency output filter is necessary, in order to reduce to a low level the high frequency ripple on the output waveform caused by switching action.

For good stability and robustness it is further necessary that the error sensed in one cycle is attenuated before being applied in the next cycle to improve the waveform. In simple terms if the system attempts in one cycle to make a total correction of the sensed error, then the system is found to be over-responsive and prone to instability. That is a principal reason for the process (c).

The least attainable degree of attenuation, i.e. highest gain, with good stability, the chosen degree of time-advance to suit the frequency characteristic of residual phase error and the chosen signal discretisation/discard level, are parameters that inter-relate particularly strongly. It is convenient to adjust their settings as a group by trial and error. The emphasis, particularly in a voltage-drive, is usually on setting the gain as high as possible, consistent with good stability and robustness. This is because with cyclic feedback the output waveform is briefly distorted at start-up and during any subsequent sudden change in the load condition and settles transiently to its correct shape in a short time. Increasing the gain acts strongly to reduce the settling time. In practice the gain can usually be set so that a substantial fraction of the transient error in the output waveform has disappeared after one cycle and the waveform has substantially settled within only a few cycles. However, with a current-drive, in practice settling time is frequently less important than with a voltage-drive and there is less emphasis on achieving high gain.

It is not essential to the working of the invention that the error waveform be derived by sampling a single cycle, or that the derived error waveform be applied to improve the output waveform in the next available cycle. It is possible to average the error over two or more cycles, and/or delay its application until a later cycle. However, both these modifications lengthen the settling time and the balance of advantage generally lies with one-cycle sampling and immediate application in the next cycle. If the output waveform is extremely symmetric in its two half-cycles and if the DC output is negligibly small without the benefit of cyclic feedback to reduce it further, it is also possible in principle to sample the error waveform over one half-cycle and to apply this result to improve the waveform in the next half-cycle, so reducing the settling time. However, practical circumstances do not generally favor this option.

The technique of third-harmonic injection is well known, whereby for three-phase output a larger output voltage may be obtained from a given DC link voltage without gross distortion of the output waveform occurring due to clipping of the voltage signal against the limits of the DC rail voltages. Application of third-harmonic injection with the invention is straight forward, involving simply the addition of a third-harmonic waveform of appropriate magnitude and phase to the required waveforms associated with each of the three-phase output lines and optionally the neutral line (if present). In this case, the magnitude and phase are the same in all of the lines.

Previous discussion has concerned the invention as it would be applied to each of the output lines of a poly-phase power conditioning unit, to reduce the distortion on those lines. The invention can equally be applied to reduce the distortion on an output neutral line, if that neutral is provided by the power conditioning unit in the form of an active line whose voltage is controlled electronically. The arrangements for sampling and feedback are generally similar to those for an output line of a poly-phase voltage-drive, the only difference being that the required voltage waveform either equals zero or the appropriate third-harmonic waveform if third-harmonic injection is employed. The optimum settings for gain, time advance, discretisation and any other implemented processes may in principle differ from those for the output lines. Preferably the voltage on the neutral line is controlled relative to the DC link and the voltages on the poly-phase lines are controlled relative to the neutral line.

As will be appreciated, the invention may be used in a voltage-drive and equally a current-drive.

Various systems and methods in which the invention is embodied will now be described by way of example only and with reference to the accompanying drawings, of which:

FIG. 2 is a block diagram of a form of voltage-drive;

FIG. 3 is a block diagram of an active damping arrangement for the drive of FIG. 2;

FIG. 4 is a block diagram of a form of current-drive, and

FIG. 5 is a block diagram of an active damping arrangement for the drive of FIG. 4.

Figure 1:
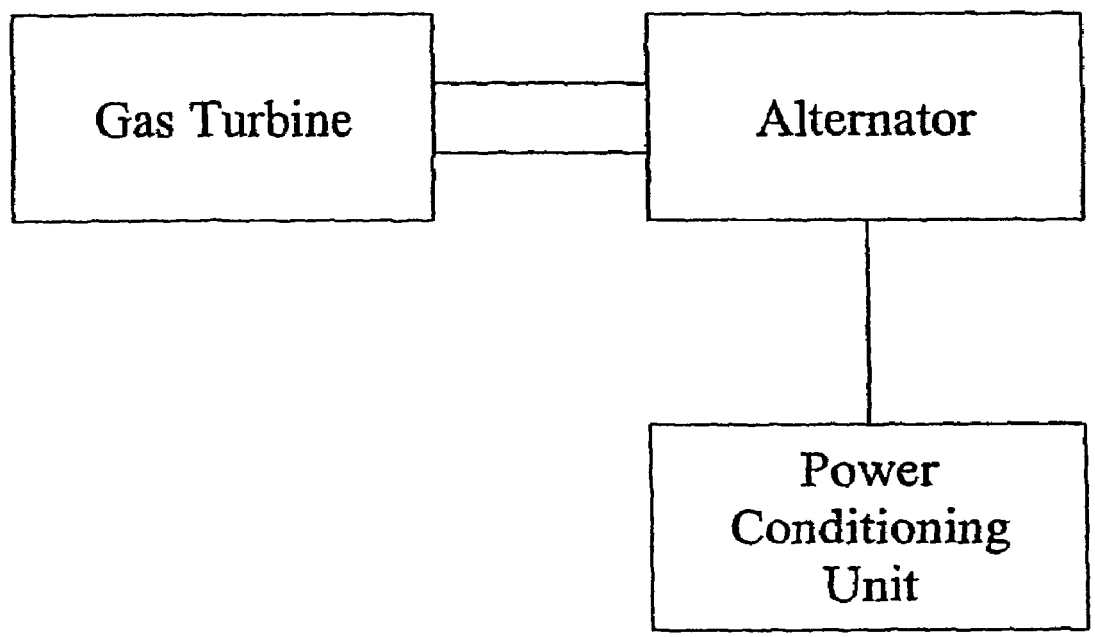
FIG. 1 is a block diagram of an electrical generator.

FIG. 2 shows a power conditioning unit for a generator, which generator is, for example, rated at 120 A RMS line current, 277 V RMS maximum phase voltage and 50/60 Hz. The power conditioning unit includes a pulse-width-modulated voltage controller, PWMVC. Simple pulse-width modulation is employed with a modulating frequency of about 8 kHz.

Included in the controller is a four-limb output inverter, each limb connected between the rails of a DC link, which is preferably 900 V. One limb of the inverter is an active neutral N and the other three limbs constitute the three-phase output lines A, B, C. Each of the four inverter lines are connected to an output filter OPF. For simplicity, the filter for only one line is depicted in the diagram. Each line filter comprises a series inductor L1 plus two parallel capacitors, each C/2, that are connected between the two rails of the DC link. The main filtering action is provided by L1 and C. Connected in series with L1 is an inductor L2. This functions primarily as a blocking inductor for ensuring that the bulk of the ripple current is shunted through the capacitance. This prevents the ripple current from passing out through the generator output terminals OA, OB, OC, ON, into the external load, as may otherwise happen if the load has low or zero effective inductance. Suitable values for the components of the active filter are L1=350 micro-H, L2=30 micro-H, C=160 micro-F.

The voltage of each output line OA, OB, OC is sensed relative to the neutral line ON. The voltage of the neutral is sensed relative to the mid-point of the DC rails and the required waveform for this line is substantially zero. The cyclic feedback path for one line is shown in the diagram. It will be appreciated that like feedback paths are provided for each of the other lines. At the start of the cyclic feedback loop, the sensed voltage signal passes through a voltage reduction stage VR. The purpose of this stage is simply to scale the voltage signal to a safe level appropriate to the signal circuitry and not to attenuate the signal as part of the signal processing. The voltage signal then passes to a phase-compensator PC1 that is operable to alter the phase-frequency characteristic of the fed back signal so as to modify the variation of phase with frequency in selected ranges of frequency in a pre-determined manner. In its purpose and function, PC1 is similar to PC2, described later. However, because PC1 precedes various signal-processing stages compared with PC2, it may be found that a particular form of compensation is more conveniently or more effectively achieved in either PC1 or PC2, as the case may be. It should be noted that any appreciable phase shift through PC1 at the basic working frequency (in this example 50/60 Hz) may lead to fundamental inaccuracy in forming the error signal at a later stage in the feedback loop, and such phase shift must accordingly be avoided.

The compensated signal then passes through an analog-to-digital converter ADC1, which in a preferred embodiment is a 10-bit processor, sampling at 8 kHz. The output of ADC1 is fed to a summing-junction and differenced with the required waveform signal RW, which is fed down time-delayed as represented by the time-lag stage Lag1. The time-delay is set to correspond with the time-delay caused by ADC1, so that the two signals at the summing-junction are in correct time-relationship, both lagging in time relative to the output waveform. The magnitude of the lag is a matter of practical convenience and is corrected later in the loop as part of the function of Adv1, which is adjusted heuristically to give optimum performance.

The output from the summing-junction is the sampled error signal waveform of the last cycle. This passes through a clipping stage Clip1, where the magnitude of any part of the waveform that exceeds a selected maximum limit is reduced in value to that limit, for example about 100 V. After this, the signal is passed to a discretisation stage Disc1 where it is modified so that the overall waveform magnitude is represented by a series of discrete values. The discretisation level, i.e. the magnitude of the change between each discrete value, is selected for optimum effect and is different from that occurring automatically in the signal sampling. As an example, the discretisation level may be set at about 5 V steps. As an alternative to discretisation, a process of discarding signal magnitudes below a threshold level of about 7 V may be used. In principle discarding is less effective in some respects, and more so in others, for reducing a tendency in one form or another to instability at higher frequencies; a heuristic process of trial-and-error is accordingly helpful in optimising the design choice. Discarding has the advantage that it saves on processor requirement as compared with discretisation.

The discretised signal (or the signal that has been through the discard process) then passes to an attenuation stage Att1. At this stage, various options for attenuating the waveform magnitude are possible. For example, the waveform could be multiplied by a gain coefficient less than unity. Alternatively, a constant amount could be subtracted from the modulus of the signal at each point of the waveform and wherever the result of the subtraction is less than zero, the value of the signal could be set to zero. Alternatively, a zoned procedure could be used, in which different zones of the AC cycles are attenuated in accordance with differently defined algorithms, the zones being different regions of time in the AC cycle or different ranges of signal magnitude. As a preferred example in this application, attenuation is by multiplication and set at about times 0.3.

The attenuated signal waveform then passes to a summing-junction, at which it is added to a signal waveform store PCE, in which is stored the cumulative error waveform of previous cycles. The two sampled waveforms are summed, passed through a further clipping stage Clip2, preferably set at about 100V, and returned into the store PCE, ready to be used as the total cumulative error waveform in the next cycle.

The stored waveform PCE is read out in the next cycle, but advanced in time by a selected amount, as represented by the block Adv1. This processed total error waveform is differenced from the waveform read out from the required waveform store RW, this difference representing the demand waveform. At this stage, a drive signal waveform for third-harmonic injection, 3HI, is added. In a preferred embodiment, third harmonic injection is employed with the injected third-harmonic voltage set to about 15% of the rated phase voltage.

The output of the summing-junction passes through a digital-to-analog converter DAC1, the output of DAC1 being the analog drive signal, including third-harmonic injection, for the next cycle. This is then passed through a phase-compensator PC2, which is similar in purpose and function to PC1. The output of PC2 represents the total demand waveform, which is input to PWMVC as a revised demand signal. This process is continuously repeated so that the output waveform progressively converges towards the required waveform, despite the presence of various undesirable harmonic distorting effects.

It should be noted that the purpose of the compensators PC1 and PC2 is to improve the linearity of the phase-frequency characteristic of the main cyclic feedback loop. By phase-frequency characteristic is meant the characteristic of change of phase with frequency around the entire cyclic feedback loop, except that the time advance feature of Adv1 is neglected, of a signal at a general frequency f, where f takes all values within the range of frequency of interest. Since, according to the nature of cyclic feedback, the signal referred to forms an input in one cycle and an output in the next cycle of cyclic feedback, the relevant phase difference is that between ouput and input signals expressed on a common time-base represented by the required waveform at basic frequency. This phase-frequency characteristic may be simulated by computational modelling. Alternatively the phase-frequency characteristic of the part of the circuit which contributes the most sizeable and complex effect may be measured. This may be done by cutting the feedback loop between DAC1 and PC2 and inputting a signal of frequency f to PC2, and likewise cutting the loop between ADC1 and PC1 and measuring the output signal from PC1.

It is desirable to maintain as far as possible a linear phase-frequency characteristic of the signal around the entire feedback loop within a pre-determined frequency range. In that circumstance, phase shift in the loop can be substantially compensated by the time shift function, as described previously, so as to give a small residual phase shift around the loop for a wide range of frequencies. Deviations of the phase-frequency characteristic from linear cannot be compensated by time shift and remain as residual phase deviations from zero after time shift compensation. To minimise the residual phase deviations, the phase-compensators PC1 and PC2 may be designed to compensate for departure of the total phase-frequency characteristic from linearity, which typically occurs in sub-ranges of frequency within the overall pre-determined range.

Both PC1 and PC2 are shown at stages in the feedback loop where the signal path is analog in form. They are typically constructed out of passive components and operational amplifiers. It will be appreciated, however, that PC1 and PC2 could equally be placed where the feedback path is digital and digital processing used. However, this has the disadvantage that the compensators PC1 and PC2 then add to the burden of signal processing in the loop and may introduce signal-distorting effects associated with digital filters.

Whilst the cyclic feedback system described above can be effective for causing the output waveform to converge towards a required waveform in a substantial range of operating conditions, the performance of the cyclic feedback system may be further improved by introducing active damping. In this arrangement, a signal from the output filter OPF is fed back to an input of the inverter, which signal is proportional to the current in the capacitor C. The active damping arrangement of FIG. 2 is shown in more detail in FIG. 3. As before, the ouput filter for only one line is shown.

FIG. 3 shows a sensor that is provided for sensing current in the capacitor C. The sensed current signal is adjusted in magnitude, equivalent in effect to multiplying the current value by a coefficient G, to provide a damping signal. The value of G may vary within a range, according to the particular application. Typically, it may have a value that is substantially of the same order as the reactance of the total capacitance C or inductance L1 at their undamped resonant frequency (these values being equal). The damping signal, is fed back to a summing-junction at an input to the inverter, as shown in FIG. 3, this summing-junction being between PC2 and the input to the pulse-width modulation stage (not shown in detail) of PWMVC. In this way, the output of the combined inverter/converter and output filter is actively damped.

In the embodiment of the voltage-drive, as described, active damping is introduced with the feedback coefficient G (see FIG. 3) set to 1.5 ohms. This degree of active damping yields a phase-frequency characteristic for the filter, which in combination with all other contributory sources of phase-frequency effect around the loop yields a total characteristic for the loop that has acceptably low deviation from linearity. In practice, for this example, the deviation may be so low as to make it possible to omit the phase-compensators PC1 and/or PC2 from the cyclic feedback loop.

In use of the circuit of FIG. 2, there are two types of feedback—cyclic feedback and active damping. In the cyclic feedback loop, which is a slow loop acting cycle-by-cycle, the output waveform is sampled, stored and compared with a pre-determined required waveform, the difference between the output and the required waveforms representing an error waveform. The error waveform is processed by clipping, discretising and attenuating, to produce a processed error waveform. Once this is done, the processed error waveform is added to a cumulative sum of processed error waveforms, with further clipping at that addition stage. The new cumulative sum of processed waveforms is advanced in time relative to the output waveform and subtracted from the required waveform to produce a revised demand waveform for use in the next AC cycle.

In the active damping loop, which is a fast-responding loop, current through the capacitor is multiplied by a coefficient G and fed to an input of the inverter as described, producing an improved phase-frequency characteristic for the closed loop of the cyclic feedback arrangement. At the same time, the active damping also acts to reduce the uncorrected harmonic distortion at the output terminals of the power conditioning unit, by which is meant, the distortion that would be present in the absence of cyclic feedback. Thus the task of the cyclic feedback is eased, which tends further to improve the performance of the generator. In this way, using both types of feedback, the combination of qualities of level of harmonic distortion, settling time, and robustness of the output waveform purity and stability to changes in load condition, may be further improved over what is available using only cyclic feedback.

Using the specific arrangement of FIGS. 2 and 3, the generator output substantially settles in 2–3 cycles following a sudden disturbance. This is advantageous. The system has been shown to provide better than 3% THD into a wide range of linear and non-linear loads.

FIG. 4 shows a power conditioning unit for a generator, which generator is, for example, rated at 120 A RMS line current, 277 V RMS maximum phase voltage and 50/60 Hz. As for the example shown in FIG. 2, the preferred DC link is 900V. In this case, however, the power conditioning unit is a current-drive, as opposed to a voltage-drive. Included in the power conditioning unit of FIG. 4 is a main inverter block, which is a bang-bang hysteresis-type current controller BBHCC for driving three output lines A,B,C, which BBHCC is preferably provided with a variable-width hysteresis-band feature. The aim of this is to keep the switching frequency roughly constant at around 8 kHz throughout the AC cycle; the band is set to vary from approximately 80 A near the zero crossovers of voltage to 40 A near the voltage peaks. Also provided is an active neutral limb N. The drive for the neutral N is a pulse-width modulated voltage controller drive PWMVC as previously described.

Connected to each of the lines in the controller is an output filter OPF, the form of which is the same as for FIG. 2. As before, for simplicity, the filter for only one line is depicted in the diagram. Again, an active damper may be incorporated around the filter and inverter, through the feedback path ADFB. For line N the nature of the active damper would be the same as that shown in FIG. 3. However, for lines A, B, C, the arrangement is slightly different. This will be described later in more detail.

Considering the operation of the cyclic feedback, the current in each output line OA, OB, OC is sensed and the voltage of the neutral is sensed relative to the mid-point of the DC rails, the required waveform for the neutral line being zero. The feedback paths for one output line are shown in FIG. 4. Concentrating on the output lines OA, OB, OC, the current in L1 is fed back to the bang-bang controller, as shown, which accordingly exercises direct control on that current and not the output current in L2. However, the cyclic feedback loop acts to correct the situation by forming an error correction term in PCE, which alters the current controlled in L1 so as to make the current in L2 accord with the required current waveform, RW. The signal fed back in the outer cyclic feedback loop is the current in L2, formed by differencing at a summation stage, the sensed currents in L1 and C.

More specifically, a sensor is provided for sensing the current passing through L1, the sensed current being added into a summing-junction with positive sign. Another sensor is provided for sensing the current passing through the capacitor C, the sensed current being added into the summing-junction with negative sign. The difference between the two sensed currents provides an indirect measure of the current in L2 at the output. The current waveform is then passed through a phase-compensator PC1, and an analog-to-digital converter ADC1, whose descriptions and functions are as previously given. The output of ADC1 is fed to a summing-junction and differenced with the required waveform signal RW, which is fed down time-delayed as represented by the time-lag stage Lag1. The time-delay is set to correspond with that caused by ADC1, as before, so that the two signals at the summing-junction are in correct relative time-phase, both lagging in time relative to the output waveform.

The output from the summing-junction is the sampled error signal waveform of the last cycle. This passes through a clipping stage Clip1, where the magnitude of any part of the waveform that exceeds a selected maximum limit is reduced in value to that limit, for example about 20 A. After this, the signal is passed to a discretisation stage Disc1 where it is modified so that the overall waveform magnitude is represented by a series of discrete values. As an example, the discretisation level may be set at about 1 A steps. As with the voltage-drive of FIG. 2, as an alternative to discretisation, a procedure of discarding signal magnitudes below a threshold level of a few amperes may be acceptable, the choice in this matter being influenced both by overall effectiveness in practice, and demand on processing power. The discretised signal (or the signal that has been through the discard process) then passes to an attenuation stage Att1. As before, various options for attenuating the waveform magnitude are possible. As a preferred example, the attenuation may be by straight multiplication and set at about times 0.02.

The processed signal waveform from Att1 then passes to a summing-junction, at which it is added to the signal waveform store PCE, which is the cumulative error waveform of previous cycles. The two sampled waveforms are summed, passed through a further clipping stage Clip2, preferably set at about 20 A, and returned into the store PCE, ready to be used as the total cumulative error waveform in the next cycle.

The stored waveform PCE is read out in the next cycle, but read out advanced in time by a selected amount, as represented by the block Adv1. This processed total error waveform is subtracted from the waveform read out from the required waveform store RW, the difference representing the demand waveform. At the same summing stage, a drive-signal waveform for third-harmonic injection, 3HI is added. In contrast to the voltage-drive of FIG. 2, this is done only for the neutral line. As before, the third-harmonic injection signal waveform, 3HI, is a voltage waveform. The voltages on the lines OA, OB, OC, relative to the neutral, are set by the voltages of the connected load, the terminal voltage characteristic of the inverter being 'soft' as noted earlier. Therefore, these lines follow the third-harmonic voltage of the neutral, so that third-harmonic injection is automatically applied to all four lines.

The output of the summing-junction passes through a digital-to-analog converter DAC1 and then to another phase-compensator PC2. The output of PC2 is the analog drive signal representing the total revised demand waveform, including third-harmonic injection, for the next cycle, which is input to BBHCC.

As mentioned previously, in addition to the cyclic feedback system described above, an active damping arrangement is provided in each of the output lines to further improve the stability and output waveform quality of the power conditioning unit. The active damping arrangement for lines A,B,C of FIG. 4 is shown in more detail in FIG. 5. As before, the ouput filter for only one line is shown.

FIG. 5 shows an active damping arrangement for a current-drive having a sensor that is provided for sensing voltage across the capacitor C. The sensed voltage is adjusted in magnitude, equivalent to multiplying it by a coefficient G, to provide a damping signal. The value of G may vary within a range to suit particular applications as previously described. In the specific example shown in FIG. 5 the coefficient is set to 0.7 inverse-ohms. Once through the multiplication stage, the resultant signal is passed through a high-pass filter HPF. This is preferably a simple second-order filter with corner frequency set at 300 Hz. After the high-pass filter, the signal is then fed back to a summing-junction at an input of the inverter, this summing-junction being between PC2 and the input to the bang-bang control stage of BBHCC (not shown in detail). In this way, the output of the combined inverter/converter and output filter is actively damped.

The chosen value of G gives a degree of damping of the L2tot-C resonance that is substantial though less than critical, depending on the characteristics of the external load and the effective value of L2tot taking account of the contribution from the load inductance. With the embodiment shown values of L2tot up to about 200 micro-H are acceptable. It should be noted that the phase-frequency characteristic of the actively damped filter is further influenced by the high-pass filter HPF.

It is found by modelling and measurement that this degree of active damping yields a phase-frequency characteristic for the filter which, in combination with all other contributory sources of phase-frequency effect around the loop, yields a total characteristic that has acceptably low deviation from linearity. As for the voltage-drive, this deviation may be sufficiently low as to make it possible to omit the phase-compensators PC1 or PC2 from the cyclic feedback loop. However, stability can only be maintained over a substantial range of load conditions with a small value of the attenuation coefficient Att1, such as to cause the settling time to occupy a considerable number of cycles. This is, however, acceptable for typical current-drive applications.

Both FIGS. 2 and 4 depict drives in which the signal processing is sufficient to provide an acceptable level of harmonic distortion, stability, and robustness, suitable for many applications. In both cases, the active damping serves a dual purpose, as described earlier. It improves the phase-frequency characteristic of the cyclic feedback loop, and it reduces the harmonic distortion at the output terminals of the power conditioning unit in the absence of cyclic feedback, thus making the task of the cyclic feedback easier and so further improving the performance of the generator.

It will be clear that in both FIG. 2 and FIG. 4, the signal path that is the main feedback loop for cyclic feedback control is essentially the same. The complete loop runs from a point following the point at which the output waveform is sensed, 101, to a point at which the required waveform signal is subtracted to yield an error signal, 102. From there, the loop runs to a point at which that error signal, after processing, is added to the cumulative error signal from previous cycles of cyclic feedback action, 103. After processing the signal is put back into the store of processed cumulative error waveform to update that waveform by one cycle, 104. The processed cumulative error waveform is then fed out, 105, time-advanced, and subtracted from the required error waveform at the summing-junction, 106. At this point a third-harmonic injection waveform may be added, the output of the summing-junction then being further signal-processed and made available as an input, point 107. Alternatively, the third-harmonic injection signal may be added after the further signal-processing, immediately prior to point 107, if that arrangement results in significantly less unwanted phase-shifting of the third-harmonic signal relative to the required waveform; this alternative is not shown in the Figures. The input 107 is to the sub-component of the system that comprises the inverter or converter and the output filter. The output from that sub-component is sensed, and the sensed signal closes the loop back to point 101.

Power conditioning units essentially similar to those described with reference to FIGS. 2 and 4 have a three-phase output (with or without a fourth neutral line), and may have a power rating in a range from a few kW to a few MW. However, the method of control is equally applicable to single-phase supply or to supply with any other phase-number and to power ratings above and below the stated range.

Whilst the units of FIGS. 2 and 4 show neutral lines, it is possible in principle that a neutral line is not required, although this may require some modification to signal processing procedures. Alternatively, the neutral line may be a passive connection to an appropriate point in the power conditioning unit. As described, it is possible for the amplitude of the AC waveform to be zero at an output line of the power conditioning unit, as may be the case with an active neutral line, or the AC waveform may contain only third-harmonic frequency, and the method in which the invention is embodied may still be applicable to the line.

The cyclic feedback loops of FIGS. 2 and 4 work to reduce unwanted harmonics in the output waveform, for all harmonics whose frequencies are integral multiples of the basic AC operating frequency, so that the distortion produced by the harmonics remains in constant phase relation to the AC cycle in successive cycles of operation. It is well known that such harmonics, of substantial size, are generated and/or modified both by internal effects within the power conditioning unit and by external effects due to the applied load. Distortion of the AC waveform by the occurrence of a DC component is also reduced by the feedback.

It should be noted that the period of the AC cycle is not constrained to be constant and may vary in accordance with the variation of output frequency, for example as the output follows the frequency of a power distribution network to which the power conditioning unit is connected. It may be assumed however that significant change in the period occurs only over a time that is long in comparison with one period, in which case no difficulties of principle are caused for the working of the invention. However, means must be provided to sense with sufficient accuracy the period of the AC cycle at any particular time.

The embodiments above are described by way of example and are only to be considered preferred and illustrative of the inventive concepts disclosed. The scope of the invention is not to be restricted to the embodiments. Various and numerous other arrangements may be devised by one skilled in the art without departing from the spirit and scope of this invention.

What is claimed is:

1. An apparatus for the improvement of waveform comprising:
   means for applying a demand input waveform at an input of a circuit for power conditioning that is operable to provide an output waveform at an output,
   a feedback loop between the input and output, the feedback loop including:
   means for sampling the output waveform,
   means for subtracting the sampled output waveform from a pre-determined required waveform to produce an error waveform,
   means for processing the error waveform in a pre-defined manner to produce a processed error waveform,
   means for adding or subtracting the processed error waveform from the demand waveform to produce a revised demand waveform, and
   means for applying the revised demand waveform to the input at a subsequent time as an input demand waveform to produce a new AC output waveform at the output.

2. The apparatus according to claim 1 further comprising:
   means for summing previous processed error waveforms;
   means for processing the sum of previous processed error waveforms to produce a processed cumulative sum of processed error waveforms, and
   means for adding the processed error waveform to the processed cumulative sum of processed error waveforms to produce a new cumulative sum of processed error waveforms,
   wherein the means for subtracting are operable to subtract the new cumulative sum of processed error waveforms from the required waveform instead of subtracting the processed error waveform from the demand waveform to produce the revised demand waveform.

3. The apparatus according to claim 2 further comprising means for providing a pre-determined degree of time shift, preferably advance, of the new cumulative sum of processed error waveforms relative to the output waveform, wherein the means for subtracting is operable to subtract the time shifted new cumulative sum of processed error waveforms from the required waveform to produce the revised waveform.

4. The apparatus according to claim 1, wherein the means for processing the error waveform comprise means for clipping the error waveform so that sampled magnitudes above a selected threshold are reduced to a pre-determined maximum value.

5. The apparatus according to claim 1, wherein the means for processing the error waveform comprise means for a discarding process in the error waveform so that changes in sampled signal magnitude below a selected threshold do not cause any change in the error waveform.

6. The apparatus according to claim 1, wherein the means for processing the error waveform comprise means for attenuating the error waveform.

7. The apparatus according to claim 2, wherein the means for processing the sum of previous error waveforms comprise means for clipping the sum of previous error waveforms so that magnitudes above a selected threshold are reduced to a pre-determined maximum value.

8. The apparatus according to claim 2, wherein the means for processing the sum of previous error waveforms comprise means for discretising the error waveform so that changes in sampled magnitude below a selected threshold do not cause any change in the sum of previous error waveforms.

9. The apparatus according to claim 2, wherein the means for processing the sum of previous error waveforms comprise means for attenuating the sum of previous error waveforms.

10. The apparatus according to claim 1 further comprising means for modifying a total phase lag from input to output so that it is approximately proportional to the frequency of the signal transmitted round the feedback loop over at least part of a pre-determined frequency spectrum.

11. The apparatus according to claim 10, wherein the pre-determined frequency spectrum extends over a substantial part of a range up to the sample frequency of the means for sampling in the feedback loop.

12. The apparatus according to claim 10, wherein the power conditioning circuit is operable in a switched mode and the pre-determined frequency is a maximum switching frequency of switched-mode operation of the power conditioning circuit.

13. The apparatus according to claim 10, wherein an approximation to proportionality between phase and frequency is represented by a phase deviation that is below plus/minus 90°.

14. The apparatus according to claim 1 further comprising an output filter that is connected to the output line.

15. The apparatus according to claim 14, wherein the output filter is an inductor-capacitor low-pass output filter.

16. The apparatus according to claim 15 further comprising an active damping feedback loop comprising a sensor for sensing current in or voltage across the capacitor, means for multiplying the sensed voltage or current by a coefficient G to provide a damping signal, and means for feeding back the damping signal to an input.

17. The apparatus according to claim 1, wherein the power conditioning circuit is of a voltage-drive form.

18. The apparatus according to claim 1, wherein the power conditioning circuit is of a current-drive form.

19. The apparatus according to claim 1 further comprising n phases with n output lines, the n lines providing n-phase outputs, each of which is separately sampled and processed to determine a revised demand waveform for each line.

20. The apparatus according to claim 19 further comprising a neutral output line that is actively controlled by electronic means.

21. The apparatus according to claim 20, wherein the output signal from the neutral output line is sampled and processed to determine the revised output waveform, the required waveform preferably being set to substantially zero.

22. The apparatus according to claim 1, wherein the means for sampling the output waveform are operable to sample the waveform over one complete AC cycle.

23. The apparatus according to claim 1, wherein more than one AC cycle is sampled and signal processing carried out over that number of cycles.

24. The apparatus according to claim 1, wherein the revised demand waveform is used in the next AC cycle of the output waveform.

25. The apparatus according to claim 1, wherein the revised demand waveform is not used in the next AC cycle but in a cycle after the next AC cycle.

26. The apparatus according to claim 1, wherein a part of one AC cycle is sampled.

27. The apparatus according to claim 1, wherein the means for sampling and processing are operable to operate in a continuous cyclic manner.

28. A method for improving a waveform comprising:
applying a demand input waveform at an input of a circuit for power conditioning that is operable to provide an output waveform at an output,
sampling the output waveform in a feedback loop between the input and output,
subtracting the sampled output waveform from a pre-determined required waveform to produce an error waveform,
processing the error waveform in a pre-defined manner to produce a processed error waveform,
adding or subtracting the processed error waveform from the demand waveform to produce a revised demand waveform, and
applying the revised demand waveform to the input at a subsequent time as an input demand waveform to produce a new AC output waveform at the output.

29. The method according to claim 28 further comprising:
summing previous processed error waveforms;
processing the sum of previous processed error waveforms to produce a processed cumulative sum of processed error waveforms, and
adding the processed error waveform to the processed cumulative sum of processed error waveforms to produce a new cumulative sum of processed error waveforms,
wherein the step of subtracting subtracts the new cumulative sum of processed error waveforms from the required waveform instead of subtracting the processed error waveform from the demand waveform to produce the revised demand waveform.

30. The method according to claim 2 further comprising means for providing a pre-determined degree of time shift, preferably advance, of the new cumulative sum of processed error waveforms relative to the output waveform, wherein the means for subtracting is operable to subtract the time shifted new cumulative sum of processed error waveforms from the required waveform to produce the revised waveform.

31. The method according to claim 28, wherein the step of processing the error waveform comprises clipping the error waveform so that sampled magnitudes above a selected threshold are reduced to a pre-determined maximum value.

32. The method according to claim 28, wherein the step of processing the error waveform comprises discretising the error waveform so that changes in sampled magnitude below a selected threshold do not cause any change in the error waveform.

33. The method according to claim 28, wherein the step of processing the error waveform comprises attenuating the error waveform.

34. The method according to claim 29, wherein the step of processing the sum of previous error waveforms comprises clipping the sum of previous error waveforms so that magnitudes above a selected threshold are reduced to a pre-determined maximum value.

35. The method according to claim 29, wherein the means for processing the sum of previous error waveforms comprise means for discretising the error waveform so that changes in sampled magnitude below a selected threshold do not cause any change in the sum of previous error waveforms.

36. The method according to claim 29, wherein the step of processing the sum of previous error waveforms comprises attenuating the sum of previous error waveforms.

37. The method according to claim 28 further comprising ensuring that a total phase lag from input to output so that it is approximately proportional to the frequency of the signal transmitted round the feedback loop over at least part of a pre-determined frequency spectrum.

38. The method according to claim 37, wherein the pre-determined frequency spectrum extends over a substantial part of a range up to the sample frequency of the means for sampling in the feedback loop.

39. The method according to claim 38, wherein the power conditioning circuit is operable in a switched mode and the pre-determined frequency is a maximum switching frequency of switched-mode operation of the power conditioning circuit.

40. The method according to claim 37, wherein an approximation to proportionality between phase and frequency is represented by a phase deviation that is below plus/minus 90°.

41. The method according to claim 28 further comprising sensing current in or voltage across the capacitor or voltage between one end of the capacitor and an effective neutral point, multiplying the sensed voltage or current by a coefficient G to provide a damping signal and feeding back the damping signal to an input.

42. The method according to claim 28, wherein the power conditioning circuit has n phases with n output lines, the n lines providing n-phase output and the method involves separately sampling and processing the signal in each line to produce a revised demand waveform for each line.

43. The method according to claim 28, wherein the step of sampling the output waveform is arranged to sample the waveform over one complete AC cycle.

44. The method according to claim 28, wherein more than one AC cycle is sampled and processing is carried out over that number of cycles.

45. The method according to claim 28, wherein the revised demand waveform is used in the next AC cycle of the output waveform.

46. The method according to claim 28, wherein the revised demand waveform is not used in the next AC cycle but in a later cycle.

47. The method according to claim 28, wherein a part of one AC cycle is sampled.

48. The method according to claim 28, wherein the steps of sampling and processing continuously carried out in a cyclic manner.

49. A micro-turbine-generator comprising:
   a gas turbine;
   a permanent-magnet alternator mechanically coupled to the gas turbine, the alternator having an output; and
   a power conditioning unit electrically coupled to the output of the alternator, the power conditioning unit comprising an apparatus for improving a waveform, said apparatus comprising:
      means for applying a demand input waveform at an input of the power conditioning unit that is operable to provide an output waveform at an output; and
      a feedback loop between the input and output, the feedback loop including:
      means for sampling the output waveform;
      means for subtracting the sampled output waveform from a predetermined required waveform to produce an error waveform;
      means for processing the error waveform in a pre-defined manner to produce a processed error waveform;
      means for adding or subtracting the processed error waveform from the demand waveform to produce a revised demand waveform; and
      means for applying the revised demand waveform to the input at a subsequent time as an input demand waveform to produce a new AC output waveform at the output.

50. The micro-turbine-generator according to claim 49, wherein the generator is transportable for use at user locations.

51. The micro-turbine-generator according to claim 50, wherein the generator is provided in a single transportable unit.

52. The apparatus according to claim 1, wherein the means for processing the error waveform comprise means for discretising the error waveform so as to make the sampled signal value assume one of a number of preset values.

53. The apparatus according to claim 10, wherein an approximation to proportionality between phase and frequency is represented by a phase deviation that is below plus/minus 60°.

54. The apparatus according to claim 10, wherein an approximation to proportionality between phase and frequency is represented by a phase deviation that is significantly below plus/minus 60°.

55. The apparatus according to claim 26, wherein half of one AC cycle is sampled.

56. The method according to claim 37, wherein an approximation to proportionality between phase and frequency is represented by a phase deviation that is below plus/minus 60°.

57. The method according to claim 37, wherein an approximation to proportionality between phase and frequency is represented by a phase deviation that is significantly below plus/minus 60°.

58. The method according to claim 47, wherein half of one AC cycle is sampled.

* * * * *

UNITED STATES PATENT AND TRADEMARK OFFICE
CERTIFICATE OF CORRECTION

PATENT NO. : 6,992,466 B2  Page 1 of 1
APPLICATION NO. : 10/433696
DATED : January 31, 2006
INVENTOR(S) : David Chadwick et al.

It is certified that error appears in the above-identified patent and that said Letters Patent is hereby corrected as shown below:

Column 2,
Line 43, "arid" should be -- and --.

Signed and Sealed this

Twenty-seventh Day of June, 2006

JON W. DUDAS
*Director of the United States Patent and Trademark Office*